US012509985B2

United States Patent
Li et al.

(10) Patent No.: US 12,509,985 B2
(45) Date of Patent: Dec. 30, 2025

(54) OIL WELL OPTICAL FIBER MULTI-PARAMETER TESTING METHOD AND APPARATUS

(71) Applicant: PetroChina Company Limited, Beijing (CN)

(72) Inventors: Yunbo Li, Beijing (CN); Mei Qi, Beijing (CN); Zhaopeng Yang, Beijing (CN); Likun Xu, Beijing (CN); Zhangcong Liu, Beijing (CN); Fang Xu, Beijing (CN); Jian Liu, Beijing (CN); Jian Li, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 0 days.

(21) Appl. No.: 18/881,223

(22) PCT Filed: Aug. 30, 2023

(86) PCT No.: PCT/CN2023/115653
§ 371 (c)(1),
(2) Date: Jan. 3, 2025

(87) PCT Pub. No.: WO2024/098899
PCT Pub. Date: May 16, 2024

(65) Prior Publication Data
US 2025/0305411 A1    Oct. 2, 2025

(30) Foreign Application Priority Data
Nov. 8, 2022 (CN) .......................... 202211388929.7

(51) Int. Cl.
*E21B 47/07* (2012.01)
*E21B 47/06* (2012.01)
(Continued)

(52) U.S. Cl.
CPC .............. *E21B 47/07* (2020.05); *E21B 47/06* (2013.01); *E21B 47/135* (2020.05); *G01D 21/02* (2013.01); *G01K 11/32* (2013.01); *G01L 11/025* (2013.01)

(58) Field of Classification Search
CPC ........ E21B 47/135; E21B 47/06; E21B 47/07; G01D 21/02
See application file for complete search history.

(56) References Cited

U.S. PATENT DOCUMENTS 10,424,027 B1 *  9/2019  Wilson ................. G01R 33/022
12,378,856 B1 *  8/2025  Bridges ................. E21B 43/128
(Continued)

FOREIGN PATENT DOCUMENTS

CN    102758617 A    10/2012
CN    103376135 A    10/2013
(Continued)

OTHER PUBLICATIONS

International Search Report for International Patent Application No. PCT/CN2023/115653, dated Nov. 3, 2023.
(Continued)

*Primary Examiner* — Shane Bomar
(74) *Attorney, Agent, or Firm* — LOZA & LOZA, LLP; Michael Fedrick

(57) ABSTRACT

Provided in the present disclosure are an oil well optical fiber multi-parameter testing method and apparatus. The method includes: collecting monitoring data at a preset position, and the monitoring data at least includes temperature data, pressure data and vibration data; performing temperature analysis on a hydrocarbon reservoir according to the temperature data; performing vibration analysis on the hydrocarbon reservoir according to the vibration data; performing conjoint analysis on the hydrocarbon reservoir
(Continued)

according to the temperature data, the pressure data and the vibration data; obtaining production parameters of hydrocarbon reservoirs in different formations according to the conjoint analysis; and obtaining flow conclusions of the hydrocarbon reservoirs according to the production parameters of the hydrocarbon reservoirs. The present disclosure solves the technical problem that it is difficult to guarantee the flow of deep-water hydrocarbon reservoirs under an offshore FPSO development mode.

13 Claims, 7 Drawing Sheets

(51) Int. Cl.
*E21B 47/135* (2012.01)
*G01D 21/02* (2006.01)
*G01K 11/32* (2021.01)
*G01L 11/02* (2006.01)

(56) References Cited

U.S. PATENT DOCUMENTS

| | | | | |
|---|---|---|---|---|
| 2002/0109080 | A1* | 8/2002 | Tubel | E21B 33/1275 250/227.14 |
| 2005/0200498 | A1* | 9/2005 | Gleitman | E21B 47/06 340/854.4 |
| 2009/0288836 | A1 | 11/2009 | Goodall et al. | |
| 2015/0090444 | A1 | 4/2015 | Partouche et al. | |
| 2015/0116124 | A1 | 4/2015 | Jaaskelainen et al. | |
| 2015/0246711 | A1 | 9/2015 | Lee | |
| 2018/0058209 | A1* | 3/2018 | Song | G01P 5/16 |
| 2020/0190976 | A1* | 6/2020 | Jaaskelainen | G01V 1/143 |
| 2020/0301393 | A1* | 9/2020 | Livescu | G06F 16/909 |
| 2021/0040841 | A1* | 2/2021 | Dusterhoft | G01V 1/226 |
| 2022/0074301 | A1* | 3/2022 | Jaaskelainen | E21B 49/087 |
| 2023/0213669 | A1* | 7/2023 | Yu | G01D 5/35361 166/250.1 |
| 2024/0027258 | A1* | 1/2024 | Wilson | G01V 1/226 |
| 2024/0029688 | A1* | 1/2024 | Ramsay | G09G 3/20 |
| 2024/0102835 | A1* | 3/2024 | Jaaskelainen | E21B 47/10 |
| 2025/0035801 | A1* | 1/2025 | Alzamil | G01H 9/004 |

FOREIGN PATENT DOCUMENTS

| | | |
|---|---|---|
| CN | 104132687 A | 11/2014 |
| CN | 105041300 A | 11/2015 |
| CN | 110344815 A | 10/2019 |
| CN | 111577255 A | 8/2020 |
| GB | 2456300 A | 7/2009 |
| KR | 101853485 B1 | 4/2018 |
| WO | 2009122166 A2 | 10/2009 |

OTHER PUBLICATIONS

Search Report made by the China Patent Information Center of the China National Intellectual Property Administration on Oct. 13, 2022.

Search Report made by the China Patent Information Center of the China National Intellectual Property Administration for corresponding Chinese Patent Application No. 202211388929.7 dated Mar. 28, 2023.

* cited by examiner

OIL WELL OPTICAL FIBER MULTI-PARAMETER TESTING METHOD AND APPARATUS

CROSS-REFERENCE TO RELATED APPLICATIONS

The present disclosure is the U.S. national stage of International Patent Application No. PCT/CN2023/115653, filed on Aug. 30, 2023, which claims priority to Chinese Patent Application No. 202211388929.7, filed on Nov. 8, 2022, and entitled "Oil well optical fiber multi-parameter testing method and apparatus".

TECHNICAL FIELD

The present disclosure relates to the technical field of oil and gas exploration and development, further to an oil well optical fiber multi-parameter testing method and apparatus, and particularly to an optical fiber multi-parameter on-line testing method and apparatus for deep-water hydrocarbon reservoirs under an offshore FPSO (Floating Production Storage and Offloading) development mode.

BACKGROUND

Oil and gas resources are one of the important sources of energy, power and basic materials for modern industrial production and daily life. With the progress of technologies, the development of offshore oil and gas fields has been gradually emphasized and implemented. At present, offshore oil and gas development platforms and modes that can be applied industrially have been formed, in which a Floating Production Storage and Offloading (FPSO) development mode is the main form of deep-water hydrocarbon reservoir development. However, due to the limitations of costs, technologies and conditions, offshore hydrocarbon reservoirs mostly use the development mode of high production in sparse wells, and the recognition and mastery of the underground dynamics, to a large extent, determines the development benefits and development effects of offshore hydrocarbon reservoirs, and dynamics monitoring technologies, particularly those with real-time, continuous and distributed characteristics and multi-parameter coupled measurement, have attracted more and more attention.

At present, although the dynamics monitoring technologies have been applied to the monitoring process of onshore oilfields, the means of real-time monitoring and analysis of the performance of deep-water hydrocarbon reservoirs under the FPSO development mode are not perfect. Therefore, an online testing method and apparatus for deep-water hydrocarbon reservoirs under the offshore FPSO development mode are needed to solve the problem that it is difficult to guarantee the flow of deep-water hydrocarbon reservoirs under the offshore FPSO development mode.

SUMMARY

The present disclosure aims to provide an oil well optical fiber multi-parameter testing method and apparatus, which can monitor and analyze the flow of deep-water hydrocarbon reservoirs, and provide guarantee for the flow of deep-water hydrocarbon reservoirs under an offshore FPSO development mode.

The objective of the present disclosure can be achieved by the following technical solutions.

The present disclosure provides an oil well optical fiber multi-parameter testing method, including the steps of:
collecting monitoring data at a preset position, in which the monitoring data at least includes temperature data, pressure data and vibration data;
performing temperature analysis on a hydrocarbon reservoir according to the temperature data;
performing vibration analysis on the hydrocarbon reservoir according to the vibration data;
performing conjoint analysis on the hydrocarbon reservoir according to the temperature data, the pressure data and the vibration data;
obtaining production parameters of hydrocarbon reservoirs in different formations according to the conjoint analysis; and
obtaining flow conclusions of the hydrocarbon reservoirs according to the production parameters of the hydrocarbon reservoirs.

The performing temperature analysis on a hydrocarbon reservoir according to the temperature data includes:
obtaining, at a formation depth where a pipe string is located, a temperature micro-differential between a position of the hydrocarbon reservoir and a position of an inner wall of a wellbore due to thermal effect;
obtaining an original formation temperature of the formation depth where the pipe string is located according to the temperature data;
obtaining an intermediate temperature variable according to the temperature micro-differential and the original formation temperature; and
obtaining a temperature of the inner wall of the wellbore according to the intermediate temperature variable and the original formation temperature.

The performing vibration analysis on the hydrocarbon reservoir according to the vibration data includes:
obtaining a vibration frequency characteristic value according to a frequency expression formula;
obtaining a vibration energy characteristic value according to an energy expression formula; and
determining a flowrate of fluid and properties of the fluid in the hydrocarbon reservoir by combining the vibration frequency characteristic value and the vibration energy characteristic value.

The present disclosure provides an oil well optical fiber multi-parameter testing apparatus, including:
a data collection unit configured to collect monitoring data at a preset position, in which the monitoring data at least includes temperature data, pressure data and vibration data;
a temperature analysis unit configured to perform temperature analysis on a hydrocarbon reservoir according to the temperature data;
a vibration analysis unit configured to perform vibration analysis on the hydrocarbon reservoir according to the vibration data;
a conjoint analysis unit configured to perform conjoint analysis on the hydrocarbon reservoir according to the temperature data, the pressure data and the vibration data;
a data obtaining unit configured to obtain production parameters of hydrocarbon reservoirs in different formations according to the conjoint analysis; and
a conclusion obtaining unit configured to obtain flow conclusions of the hydrocarbon reservoirs according to the production parameters of the hydrocarbon reservoirs.

The present disclosure has the following advantageous effects:

The oil well optical fiber multi-parameter testing method and apparatus, by collecting the temperature data, the pressure data and the vibration data at the preset position, performing temperature analysis and vibration analysis on the hydrocarbon reservoirs respectively according to the collected temperature data and vibration data, and then performing conjoint analysis on the hydrocarbon reservoirs according to the temperature data, the pressure data and the vibration data, so as to obtain the production parameters of the hydrocarbon reservoirs in different formations, and then obtaining the flow conclusions of the hydrocarbon reservoirs according to the production parameters of the hydrocarbon reservoirs, provide guarantee and conclusions for the flow of deep-water hydrocarbon reservoirs under the offshore FPSO development mode.

BRIEF DESCRIPTION OF THE DRAWINGS

The following drawings are only for schematic illustration and illustration of the present disclosure, rather than limiting the scope of the present disclosure. In which.

DESCRIPTION OF THE EMBODIMENTS

In order to have a clearer understanding of the technical features, objectives and effects of the present disclosure, the embodiments of the present disclosure will now be described with reference to the drawings.

Embodiment 1

Figure 1:
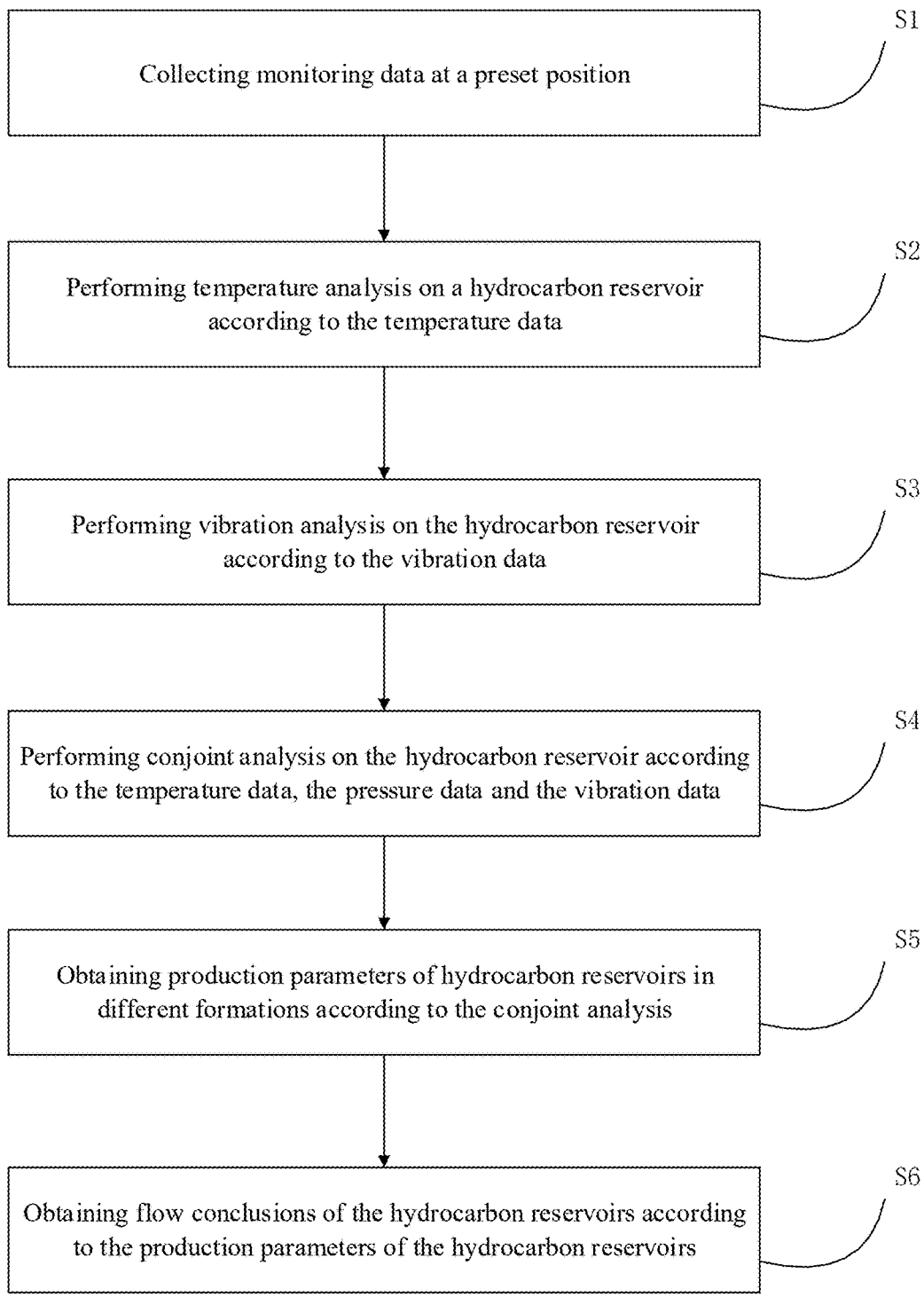
FIG. 1 illustrates a first flowchart of an oil well optical fiber multi-parameter testing method according to the present disclosure.

As illustrated in FIG. 1, the present disclosure provides an oil well optical fiber multi-parameter testing method, which includes the following steps:

Step S1: collecting monitoring data at a preset position, in which the monitoring data at least includes temperature data, pressure data and vibration data.

Further, in step S1, the preset position at least includes positions of an FPSO hull 4, a submarine pipeline, a wellhead, a wellbore 3 and different formations in a well, and the global distributed continuous temperature tests, pressure tests and vibration tests of hydrocarbon reservoirs are realized by the oil well optical fiber multi-parameter testing method.

Figure 5:
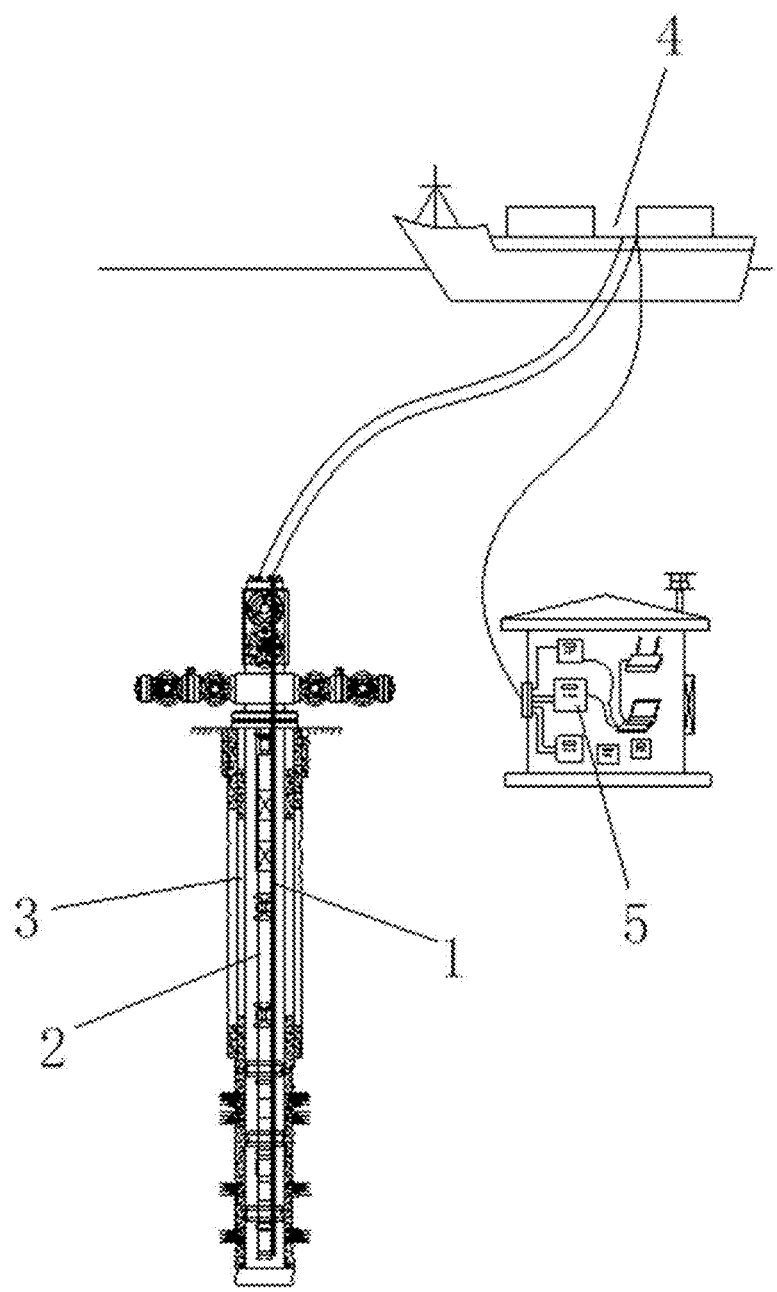
FIG. 5 illustrates a diagram of the layout of monitoring optical cables in an oil well optical fiber multi-parameter testing method according to the present disclosure.

In an optional embodiment of the present disclosure, as illustrated in FIG. 5, in step S1, the collecting monitoring data at a preset position includes:

Step S101: placing a monitoring optical cable 1 into a well along with a pipe string 2;

Step S102: performing distributed continuous temperature tests, pressure tests and vibration tests on the preset position.

Specifically, a plurality of optical fibers are composited in the monitoring optical cable 1, and each of the optical fibers includes one temperature measuring optical fiber 101, one vibration measuring optical fiber 102, and a plurality of pressure measuring optical fibers 103, and the number of the pressure measuring optical fibers 103 is determined according to the number of pressure measuring points in the preset position, so that each of the pressure measuring optical fibers 103 is arranged at a corresponding pressure measuring point. The temperature measuring optical fiber 101 may be, but not limited to, a multi-mode temperature measuring optical fiber, the vibration measuring optical fiber 102 may be, but not limited to, a single-mode vibration measuring optical fiber, and the pressure measuring optical fiber 103 may be, but not limited to, a single-mode pressure measuring optical fiber.

Further, the pressure measuring optical fiber 103 is provided with a plurality of optical fiber pressure sensors, and the optical fiber pressure sensors are arranged in layers at corresponding formation depths, so as to achieve the purpose of multi-point distribution arrangement.

As illustrated in FIG. 5, for the arrangement of the monitoring optical cable 1, a ground testing process and a downhole testing process may be used in coordination.

The ground testing process: during the replacement of the pipe string 2 in a test well, the monitoring optical cable 1 is bound to the pipe string 2 and placed into the well together therewith. During operation, the construction is carried out on an FPSO ship together with the operators. Each of the optical fiber pressure sensors is connected by a single optical cable and arranged at different formation depths. Meanwhile, the optical fiber pressure sensors are provided with pressure gauge carriers to protect the pressure measuring points. Packers are arranged in the wellbore 3 and located between the formations with different depths, and the packer is penetrable, and the monitoring optical cable 1 may be sealed after penetrating the packer. When each of the pipe strings 2 is placed, an optical cable protector is mounted at an oil pipe coupling for fixation. After the placement of the pipe string 2, the monitoring optical cable 1 may be penetrated out of the wellhead according to the position of a through hole at the wellhead, thereby realizing the mounting of the monitoring optical cable 1.

The downhole testing process: a position at which the monitoring optical cable 1 penetrates the wellhead is sealed using the existing offshore deep-water oilfield downhole technology, the monitoring optical cable 1 is fixed with an umbilical and connected to a test demodulation device 5 in the FPSO hull 4, and a tail end of the monitoring optical cable 1 is provided with an optical fiber sealer to realize the safety control of the downhole optical cable. The test demodulation device 5 is an existing demodulation device and will not be described here.

Step S2: performing temperature analysis on a hydrocarbon reservoir according to the temperature data.

Figure 2:
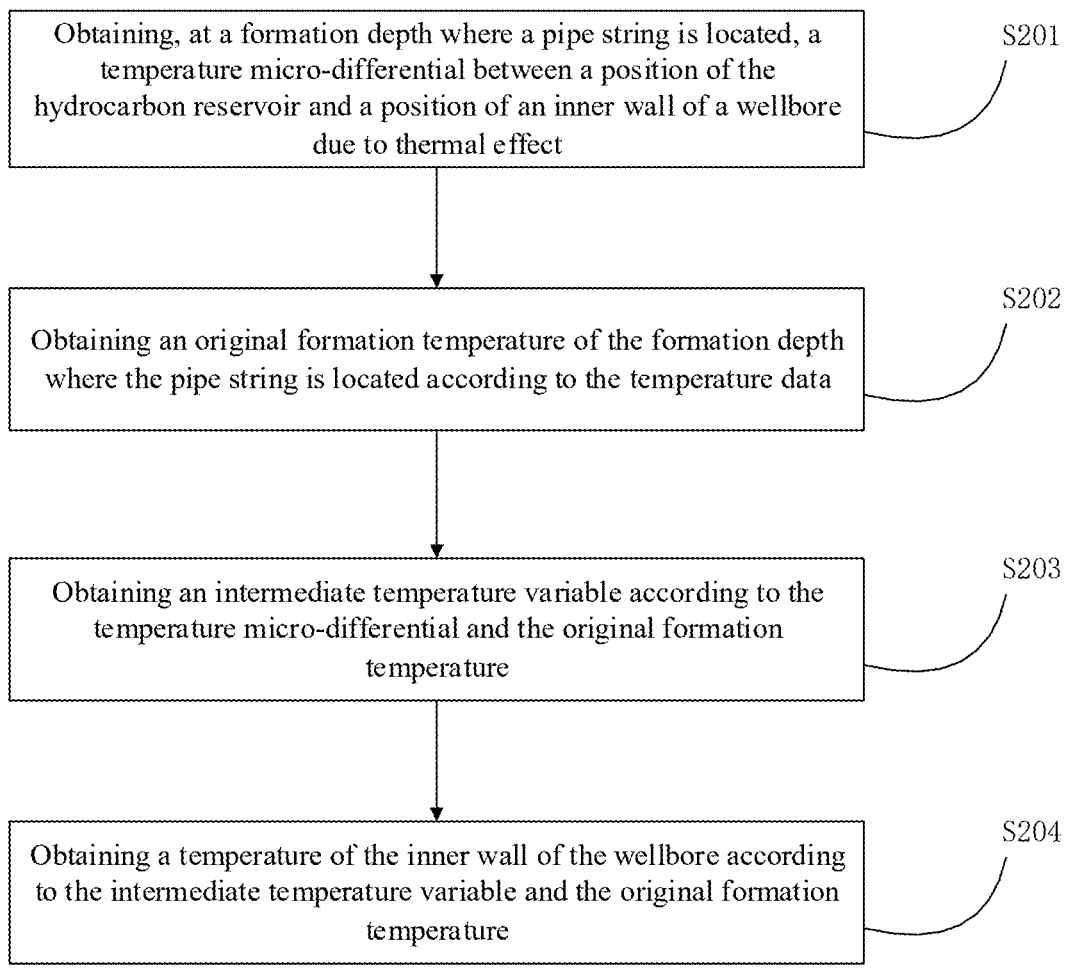
FIG. 2 illustrates a second flowchart of an oil well optical fiber multi-parameter testing method according to the present disclosure.
Figure 7:
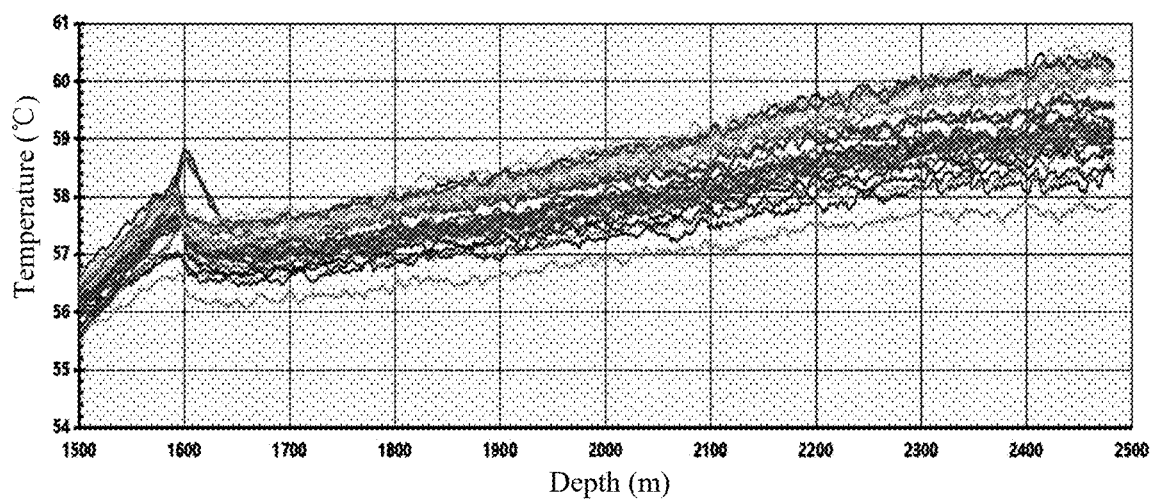
FIG. 7 illustrates a diagram of a relationship between well depths and temperatures monitored at different time points in an oil well optical fiber multi-parameter testing method according to the present disclosure.

In an optional embodiment of the present disclosure, as illustrated in FIGS. 2 and 7, Step S2 (an integrated temperature analysis method for borehole wall and hydrocarbon reservoir and wellbore under the offshore FPSO development mode) includes:

Step S201: obtaining, at a formation depth where a pipe string 2 is located, a temperature micro-differential between a position of the hydrocarbon reservoir and a position of an inner wall of a wellbore 3 due to thermal effect;

further, according to the formation depth where the pipe string 2 is located, a Joule-Thomson effect (i.e., throttling effect) may be used to calculate the temperature micro-differential $\Delta T_1$ between the position of the hydrocarbon reservoir and the position of the inner wall of the wellbore 3 due to thermal effect;

Step S202: obtaining an original formation temperature $T_0$ of the formation depth where the pipe string 2 is located according to the temperature data;

Step S203: obtaining an intermediate temperature variable $T_s$ according to the temperature micro-differential and the original formation temperature $T_0$, and the intermediate temperature variable $T_s$ satisfies a formula:

$$T_s = T_0 + \Delta T_1;$$

step S204: obtaining a temperature $T_h$ of the inner wall of the wellbore 3 according to the intermediate temperature variable $T_s$ and the original formation temperature $T_0$, and the temperature $T_h$ of the inner wall of the wellbore 3 satisfies a formula:

$$T_h = \frac{UT_s + \frac{2\lambda}{r_\infty \ln \frac{2.25\alpha t}{r_\infty^2}} T_0}{U + \frac{2\lambda}{r_\infty \ln \frac{2.25\alpha t}{r_\infty^2}}};$$

where U represents a radial total heat transfer coefficient of the pipe string of the wellbore, $r_{co}$ represents an outer radius of a casing, $\alpha$ represents a formation thermal diffusion coefficient and $\lambda$ represents a formation thermal conductivity coefficient.

Figure 3:
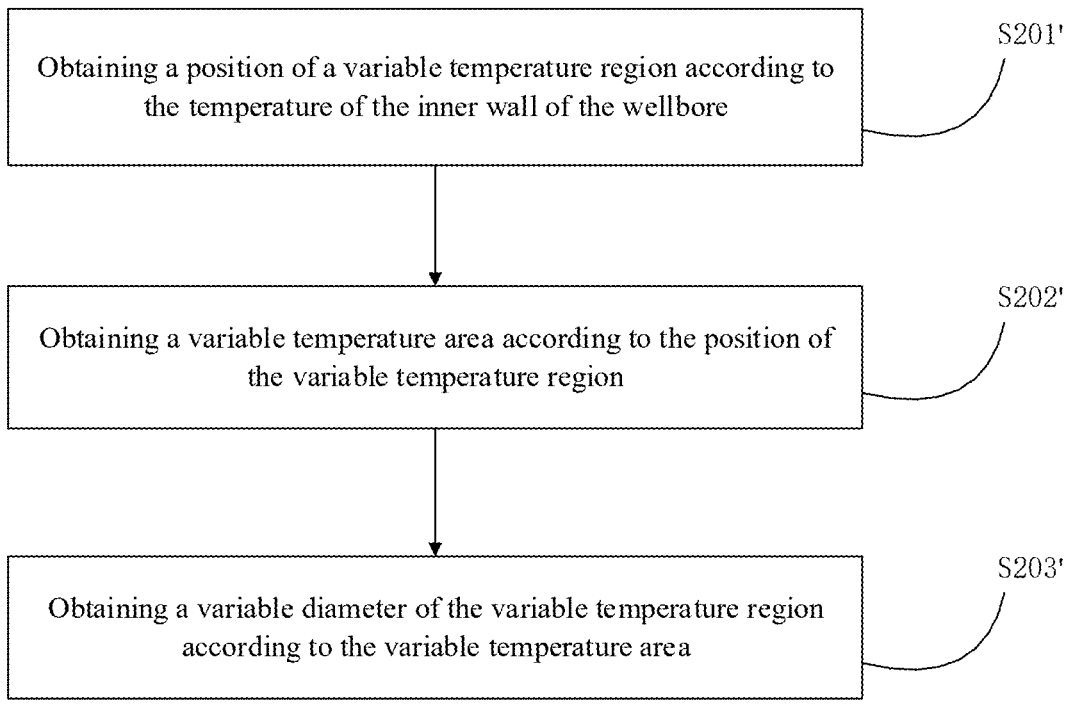
FIG. 3 illustrates a third flowchart of an oil well optical fiber multi-parameter testing method according to the present disclosure.

Further, as illustrated in FIG. 3, Step S2 (an integrated temperature analysis method for borehole wall and hydrocarbon reservoir and wellbore in the offshore FPSO development mode) further includes:

Step S201': obtaining a position of a variable temperature region according to the temperature of the inner wall of the wellbore 3, and the position of the variable temperature region may be obtained according to the monitored temperature data;

Step S202': obtaining a variable temperature area A according to the position of the variable temperature region;

and, the variable temperature area A satisfies a formula:

$$A = \frac{2iC_1 hM_r \alpha_b}{4\lambda_b} \left( e^{t_d} \operatorname{erfc} \sqrt{t_d} + 2\sqrt{\frac{t_d}{\pi}} - 1 \right);$$

where $t_d$ a represents a dimensionless time, $$t_d = \frac{4\lambda_b^2}{(hM_r)^2 \alpha_b} t;$$

t represents an injection-production time; i represents a fluid injection-production speed; $C_l$ represents a fluid specific heat; h represents a thickness of a formation with seepage capability; $M_r$ represents a reservoir heat capacity; $\alpha_b$ represents a thermal diffusion coefficient of top and bottom layers, or an adjacent formation; $\lambda_b$ represents a thermal conductivity coefficient of top and bottom layers, or an adjacent formation; and erfc represents an error compensation function;

Step S203': obtaining a variable diameter R of the variable temperature region according to the variable temperature area A;

and, the variable diameter R of the variable temperature region satisfies a formula:

$$R = \sqrt{\frac{4A^2}{4\pi A + \pi h^2}};$$

where A represents a variable temperature area, and h represents a thickness of a formation with seepage capability.

Step S3: performing vibration analysis on the hydrocarbon reservoir according to the vibration data.

Figure 4:
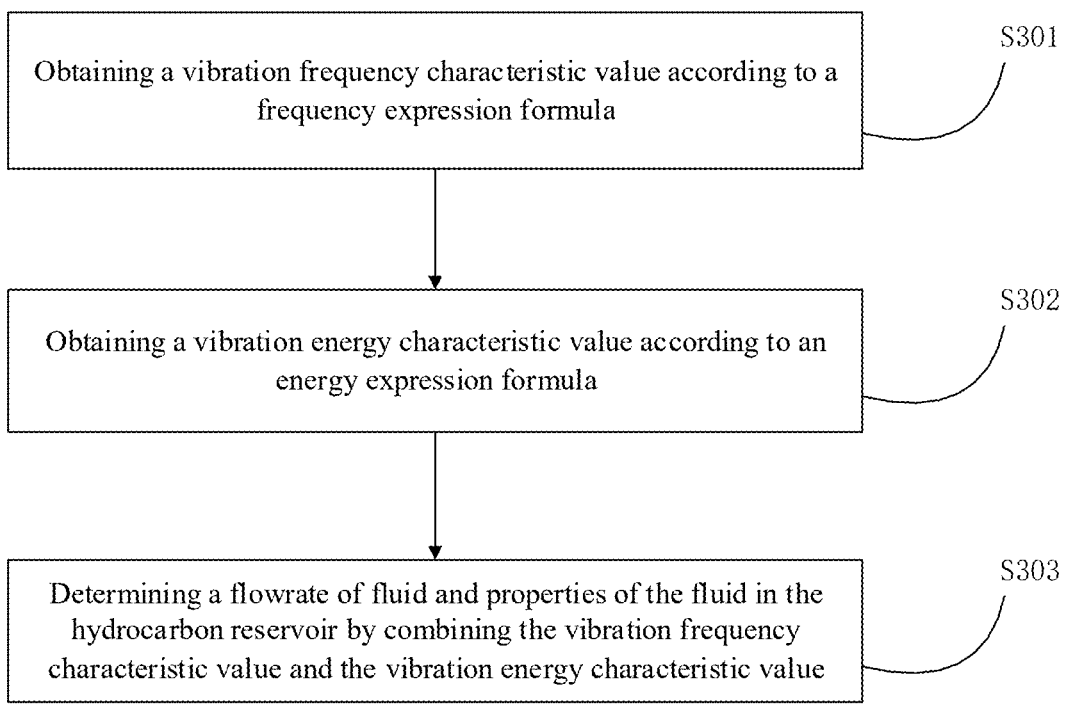
FIG. 4 illustrates a fourth flowchart of an oil well optical fiber multi-parameter testing method according to the present disclosure.
Figure 8:
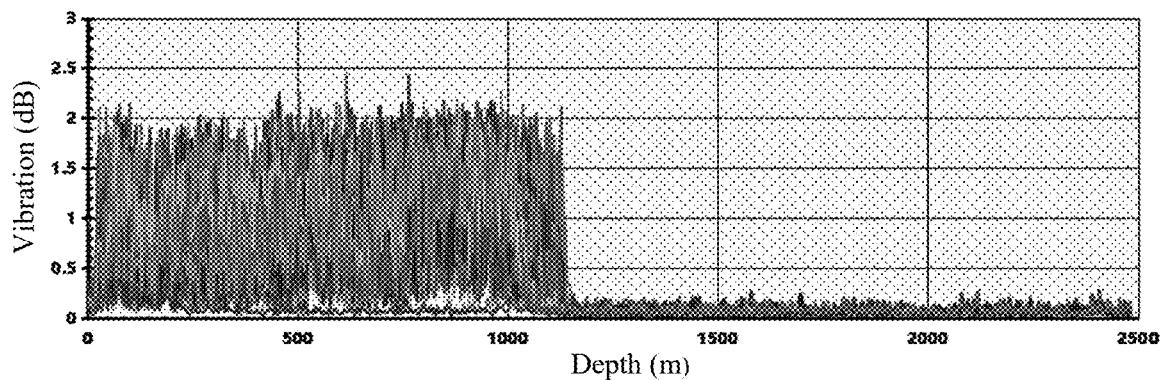
FIG. 8 illustrates a diagram of a relationship between vibrations and temperatures monitored at different time points in an oil well optical fiber multi-parameter testing method according to the present disclosure.

In an optional embodiment of the present disclosure, as illustrated in FIGS. 4 and 8, step S3 (a fluid-structure interaction vibration analysis method for a wellbore flow and reservoir seepage system under the offshore FPSO development mode) includes:

Step S301: obtaining a vibration frequency characteristic value $N_{Re}$ according to a frequency expression formula; and the vibration frequency characteristic value $N_{Re}$ satisfies a formula:

$$N_{Re} = \theta \frac{\rho D}{\mu^{n1}};$$

where $N_{Re}$ represents a vibration frequency characteristic value; $\rho$ represents a fluid density; D represents a spatial characteristic scale; $\mu$ represents a fluid viscosity; $\theta$ represents a frequency correction coefficient (which may be determined from field experiences); n1 represents a constant coefficient (which may be measured from experiments);

Step S302: obtaining a vibration energy characteristic value $E_{Re}$ according to an energy expression formula; and the vibration energy characteristic value $E_{Re}$ satisfies a formula:

$$E_{Re} = \bar{\omega}\frac{\rho v^m D}{\mu^{n2}};$$

where $E_{Re}$ represents a vibration energy characteristic value; v represents a fluid velocity; $\bar{\omega}$ represents an energy correction coefficient (which may be determined from field experiences); and both m and n2 are constant coefficients (which may be measured from experiments).

Step S303: determining a flowrate of fluid and properties of the fluid in the hydrocarbon reservoir by combining the vibration frequency characteristic value $N_{Re}$ and the vibration energy characteristic value $E_{Re}$.

The constant coefficients in $N_{Re}$ and $E_{Re}$ are calibrated using the wellhead parameters and the fluid type of oil, gas and water, and the flowrate and the properties of the fluid in the hydrocarbon reservoir may be identified by the combination of $N_{Re}$ and $E_{Re}$.

Step S4: performing conjoint analysis on the hydrocarbon reservoir according to the temperature data, the pressure data and the vibration data;

and in Step S4, performing conjoint analysis on the hydrocarbon reservoir at least includes: identifying an injected water source and an intraformational water source.

Figure 9:
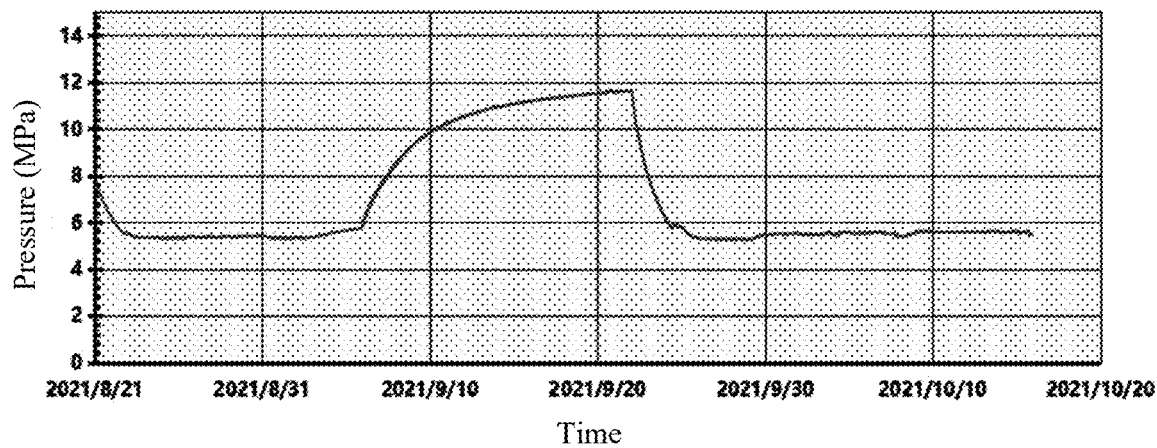
FIG. 9 illustrates a diagram of a relationship between monitoring time and pressure in an oil well optical fiber multi-parameter testing method according to the present disclosure.

Further, the water source of injected water includes an adjacent well water source or fracturing fluid, and may be determined through a comprehensive determination of multi-parameter test, well group full-cycle dynamics and fracturing data, with at least one of the following characteristics:

1. As illustrated in FIG. 7, the temperature has a directional variation and presents a local step variation, and a variation speed of the temperature is greater than a temperature variation amplitude of a heat conduction of the wellbore 3.
2. As illustrated in FIG. 8, the vibration energy characteristic value has a local extreme point, and the vibration frequency characteristic value is higher than an average value.
3. As illustrated in FIG. 9, the pressure characteristics conform to the flow characteristics of non-conservation, variable friction and variable density of the fluid exchange between the wellbore 3 and the formation.

Further, identifying the intraformational water source is a comprehensive identification of multi-parameter test, well group full-cycle performance and fracturing data using a principle of gravitational differentiation and temperature profile correlation, with at least one of the following characteristics:

1. As illustrated in FIG. 7, the temperature has a directional variation and presents a local step variation, and there are different variation directions on the test profile.
2. As illustrated in FIG. 8, the vibration energy characteristic value has a local extreme point, and the vibration frequency characteristic value is higher than an average value.
3. As illustrated in FIG. 9, the pressure characteristics conform to the flow characteristics of non-conservation, variable friction and variable density of the fluid exchange between the wellbore 3 and the formation.

Figure 10:
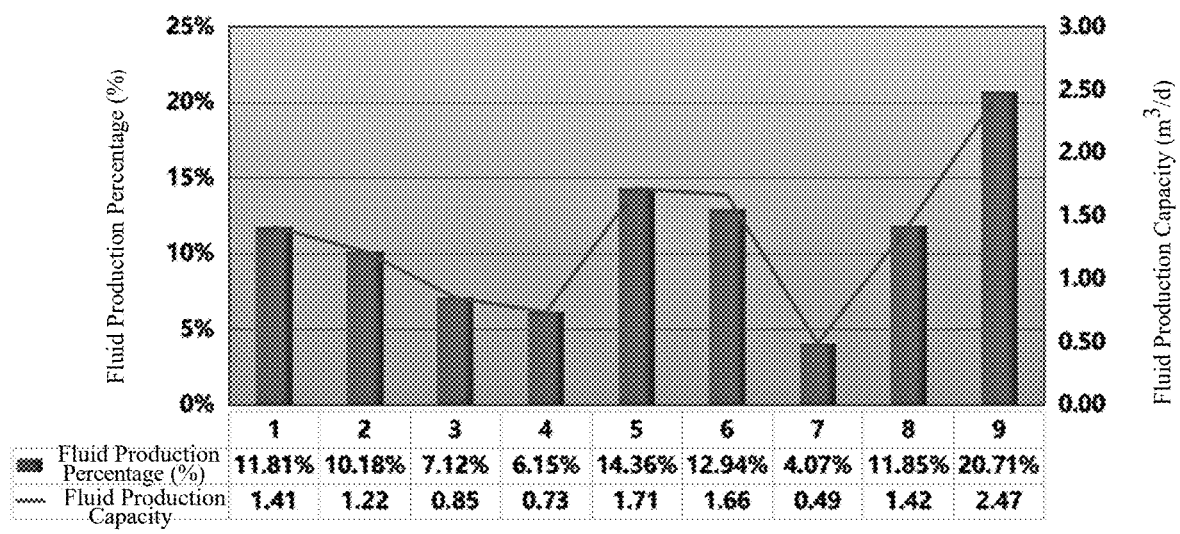
FIG. 10 illustrates a diagram of fluid production percentages and fluid production capacities which are at different formation depths in an oil well optical fiber multi-parameter testing method according to the present disclosure.

Step S5: obtaining production parameters of hydrocarbon reservoirs in different formations according to the conjoint analysis;

and as illustrated in FIG. 10, the production parameters of the hydrocarbon reservoirs at least include a production quantity of the hydrocarbon reservoir in each of the formations and a production percentage of the hydrocarbon reservoir in each of the formations.

Step S6: obtaining flow conclusions of the hydrocarbon reservoirs according to the production parameters of the hydrocarbon reservoirs.

After the temperature data, the vibration data, the pressure data and the production parameters of the hydrocarbon reservoirs are determined, flow assurance knowledge and conclusions can be formed in combination with actual application scenarios, in which the flow assurance knowledge and conclusions include, but are not limited to, a main liquid producing layer, a main water producing layer, a segmented production variation rule and whether the flow from the formation to the wellbore 3 is smooth.

The micro-thermal effect and the heat transfer rule are generally existed in the fluid flowing process, and through the reasonable utilization and the quantitative analysis of the optical fiber, the present disclosure can obtain a large amount of temperature data in the time and spatial domains, invert and recognize the downhole continuous dynamics of production and inflow of the deep-water hydrocarbon reservoir, and the average cost of data obtaining is low. As a necessary basic monitoring index, the pressure is generally monitored in parallel with the temperature monitoring, for a separate analysis evaluation or a temperature-pressure conjoint analysis evaluation. Since the deep-water hydrocarbon reservoir has a high economic production, the wellbore is greatly influenced by the inertia force in the flow process, and the vibration is obvious due to the fluid-structure interaction effect, the present disclosure can monitor the response signal through the optical fiber monitoring, and achieve the conjoint detection and evaluation of temperature, pressure and vibration. The present disclosure provides a direct, economical, long-term, online, continuous and accurate method for obtaining various key parameters of the production and flow of deep-water hydrocarbon reservoirs, which achieves a good supporting effect and utilization value in the development process of deep-water hydrocarbon reservoirs.

The oil well optical fiber multi-parameter testing method of the present disclosure has the following characteristics and advantages:

The oil well optical fiber multi-parameter testing method and apparatus, by collecting the temperature data, the pressure data and the vibration data at the preset position, performing temperature analysis and vibration analysis on the hydrocarbon reservoirs respectively according to the collected temperature data and vibration data, and then performing conjoint analysis on the hydrocarbon reservoirs according to the temperature data, the pressure data and the vibration data, so as to obtain the production parameters of the hydrocarbon reservoirs in different formations, and then obtaining the flow conclusions of the hydrocarbon reservoirs according to the production parameters of the hydrocarbon reservoirs, provide guarantee and conclusions for the flow of deep-water hydrocarbon reservoirs under the offshore FPSO development mode.

Embodiment 2

Figure 11:
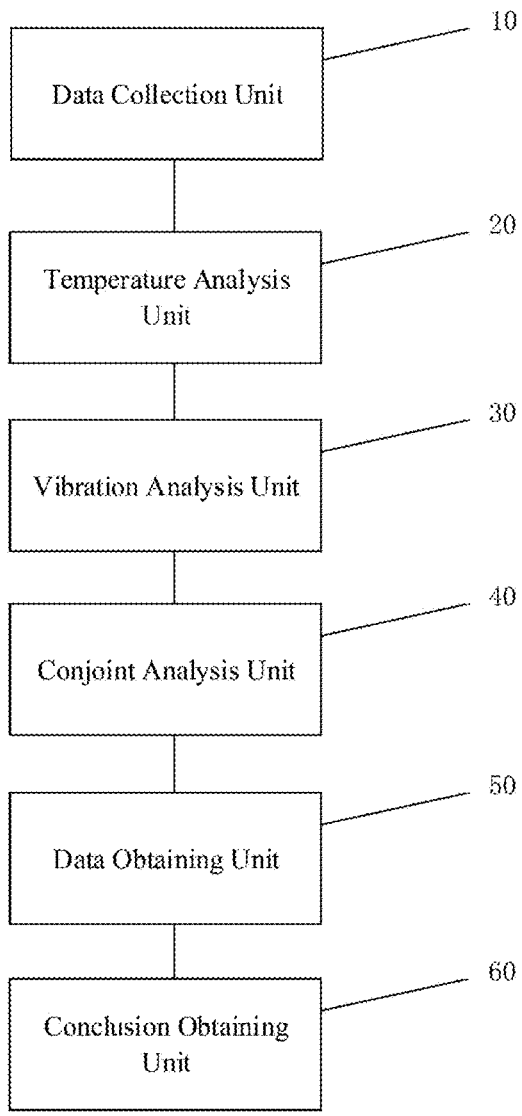
FIG. 11 illustrates a structural block diagram of an oil well optical fiber multi-parameter testing apparatus according to the present disclosure.

As illustrated in FIG. 11, the present disclosure provides an oil well optical fiber multi-parameter testing apparatus, which includes a data collection unit 10, a temperature analysis unit 20, a vibration analysis unit 30, a conjoint analysis unit 40, a data obtaining unit 50 and a conclusion obtaining unit 60, in which:

the data collection unit 10 is configured to collect monitoring data at a preset position, and the monitoring data at least includes temperature data, pressure data and vibration data;

the temperature analysis unit 20 is configured to perform temperature analysis on a hydrocarbon reservoir according to the temperature data;

the vibration analysis unit 30 is configured to perform vibration analysis on the hydrocarbon reservoir according to the vibration data;

the conjoint analysis unit 40 is configured to perform conjoint analysis on the hydrocarbon reservoir according to the temperature data, the pressure data and the vibration data;

the data obtaining unit 50 is configured to obtain production parameters of hydrocarbon reservoirs in different formations according to the conjoint analysis; and the conclusion obtaining unit 60 is configured to obtain flow conclusions of the hydrocarbon reservoirs according to the production parameters of the hydrocarbon reservoirs.

Figure 6:
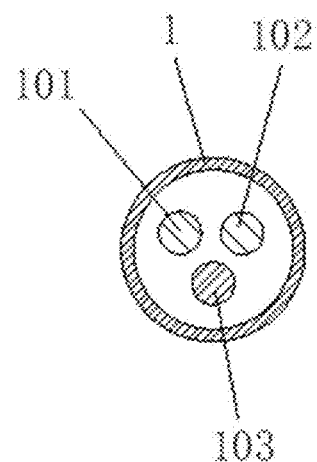
FIG. 6 illustrates a cross-sectional view of a monitoring optical cable in an oil well optical fiber multi-parameter testing method according to the present disclosure.

In an optional embodiment of the present disclosure, as illustrated in FIG. 6, the data collection unit 10 includes a monitoring optical cable 1, the monitoring optical cable is provided therein with a plurality of optical fibers, each of which includes one temperature measuring optical fiber 101, one vibration measuring optical fiber 102, and a plurality of pressure measuring optical fibers 103, and the number of the pressure measuring optical fibers 103 is determined according to the number of pressure measuring points in the preset position, so that each of the pressure measuring optical fibers 103 is arranged at a corresponding pressure measuring point.

Further, the pressure measuring optical fiber 103 is provided with a plurality of optical fiber pressure sensors, and the optical fiber pressure sensors are arranged in layers at corresponding formation depths.

Further, the monitoring optical cable 1 is bound to the pipe string 2 and placed into a well together therewith, and the pipe string 2 is provided with pressure gauge carriers at positions where the optical fiber pressure sensors are located.

Further, the monitoring optical cable I is penetrated out of a through hole at a wellhead and connected to a test demodulation device 5 on an FPSO hull 4, and the wellhead is sealed.

Specifically, a plurality of optical fibers are composited in the monitoring optical cable 1, and each of the optical fibers includes one temperature measuring optical fiber 101, one vibration measuring optical fiber 102, and a plurality of pressure measuring optical fibers 103, and the number of the pressure measuring optical fibers 103 is determined according to the number of pressure measuring points in the preset position, so that each of the pressure measuring optical fibers 103 is arranged at a corresponding pressure measuring point. The temperature measuring optical fiber 101 may be, but not limited to, a multi-mode temperature measuring optical fiber, the vibration measuring optical fiber 102 may be, but not limited to, a single-mode vibration measuring optical fiber, and the pressure measuring optical fiber 103 may be, but not limited to, a single-mode pressure measuring optical fiber.

Further, the pressure measuring optical fiber 103 is provided with a plurality of optical fiber pressure sensors, and the optical fiber pressure sensors are arranged in layers at corresponding formation depths, so as to achieve the purpose of multi-point distribution arrangement.

As illustrated in FIG. 5, for the arrangement of the monitoring optical cable 1, a ground testing process and a downhole testing process may be used in coordination.

The ground testing process: during the replacement of the pipe string 2 in a test well, the monitoring optical cable 1 is bound to the pipe string 2 and provided into the well together therewith. During operation, the construction is carried out on an FPSO ship together with the operators. Each of the optical fiber pressure sensors is connected by a single optical cable and arranged at different formation depths. Meanwhile, the optical fiber pressure sensors are provided with pressure gauge carriers to protect the pressure measuring points. Packers are provided in the wellbore 3 and located between the formations with different depths, and the packer is penetrable, and the monitoring optical cable 1 may be sealed after penetrating the packer. When each of the pipe strings 2 is placed, an optical cable protector is mounted at an oil pipe coupling for fixation. After the placement of the pipe string 2, the monitoring optical cable 1 may be penetrated through the wellhead according to the position of a penetration hole at the wellhead, thereby realizing the mounting of the monitoring optical cable 1.

The downhole testing process: a position at which the monitoring optical cable 1 penetrates the wellhead is sealed using the existing offshore deep-water oilfield downhole technology, the monitoring optical cable 1 is fixed with an umbilical and connected to a test demodulation device 5 in the FPSO hull 4, and a tail end of the monitoring optical cable 1 is provided with an optical fiber sealer to realize the safety control of the downhole optical cable. The test demodulation device 5 is an existing demodulation device and will not be described here.

The oil well optical fiber multi-parameter testing apparatus of the present disclosure has the following characteristics and advantages:

The oil well optical fiber multi-parameter testing method and apparatus, by collecting the temperature data, the pressure data and the vibration data at the preset position, performing temperature analysis and vibration analysis on the hydrocarbon reservoirs respectively according to the collected temperature data and vibration data, and then performing conjoint analysis on the hydrocarbon reservoirs according to the temperature data, the pressure data and the vibration data, so as to obtain the production parameters of the hydrocarbon reservoirs in different formations, and then obtaining the flow conclusions of the hydrocarbon reservoirs according to the production parameters of the hydrocarbon reservoirs, provide guarantee and conclusions for the flow of deep-water hydrocarbon reservoirs under the offshore FPSO development mode.

Those described above are only illustrative specific embodiments of the present disclosure, and are not intended to limit the scope of the present disclosure. Any equivalent change and modification made by persons skilled in the art without departing from the concept and principle of the present disclosure should fall within the protection scope of the present disclosure.

What is claimed is:

1. An oil well optical fiber multi-parameter testing method, comprising the steps of:
   collecting monitoring data at a preset position, wherein the monitoring data at least comprises temperature data, pressure data and vibration data;

performing temperature analysis on a hydrocarbon reservoir according to the temperature data;
performing vibration analysis on the hydrocarbon reservoir according to the vibration data;
performing conjoint analysis on the hydrocarbon reservoir according to the temperature data, the pressure data and the vibration data;
obtaining production parameters of hydrocarbon reservoirs in different formations according to the conjoint analysis; and
obtaining flow conclusions of the hydrocarbon reservoirs according to the production parameters of the hydrocarbon reservoirs;
wherein the performing temperature analysis on a hydrocarbon reservoir according to the temperature data comprises:
obtaining, at a formation depth where a pipe string is located, a temperature micro-differential between a position of the hydrocarbon reservoir and a position of an inner wall of a wellbore due to thermal effect;
obtaining an original formation temperature of the formation depth where the pipe string is located according to the temperature data;
obtaining an intermediate temperature variable according to the temperature micro-differential and the original formation temperature; and
obtaining a temperature of the inner wall of the wellbore according to the intermediate temperature variable and the original formation temperature;
wherein the performing vibration analysis on the hydrocarbon reservoir according to the vibration data comprises:
obtaining a vibration frequency characteristic value according to a frequency expression formula;
obtaining a vibration energy characteristic value according to an energy expression formula; and
determining a flowrate of fluid and properties of the fluid in the hydrocarbon reservoir by combining the vibration frequency characteristic value and the vibration energy characteristic value.

2. The oil well optical fiber multi-parameter testing method according to claim 1, wherein in the step of collecting monitoring data at the preset position, the preset position at least comprises positions of a Floating Production Storage and Offloading (FPSO) hull, a submarine pipeline, a wellhead, a wellbore and different formations in a well.

3. The oil well optical fiber multi-parameter testing method according to claim 2, wherein the collecting monitoring data at the preset position comprises:
placing a monitoring optical cable into a well along with a pipe string; and
performing distributed continuous temperature tests, pressure tests and vibration tests on the preset position.

4. The oil well optical fiber multi-parameter testing method according to claim 3, wherein the monitoring optical cable is provided therein with a plurality of optical fibers, each of which comprises one temperature measuring optical fiber, one vibration measuring optical fiber, and a plurality of pressure measuring optical fibers; and
the number of the pressure measuring optical fibers is determined according to the number of pressure measuring points in the preset position, so that each of the pressure measuring optical fibers is arranged at a corresponding pressure measuring point.

5. The oil well optical fiber multi-parameter testing method according to claim 4, wherein the pressure measuring optical fiber is provided with a plurality of optical fiber pressure sensors, and the optical fiber pressure sensors are arranged in layers at corresponding formation depths.

6. The oil well optical fiber multi-parameter testing method according to claim 1, wherein the performing temperature analysis on the hydrocarbon reservoir according to the temperature data comprises:
obtaining a position of a variable temperature region according to the temperature of the inner wall of the wellbore;
obtaining a variable temperature area according to the position of the variable temperature region; and
obtaining a variable diameter of the variable temperature region according to the variable temperature area.

7. The oil well optical fiber multi-parameter testing method according to claim 1, wherein the performing conjoint analysis on the hydrocarbon reservoir at least comprises: identifying an injected water source and an intraformational water source.

8. The oil well optical fiber multi-parameter testing method according to claim 1, wherein the production parameters of the hydrocarbon reservoirs at least comprise a production quantity of the hydrocarbon reservoir in each of the formations and a production percentage of the hydrocarbon reservoir in each of the formations.

9. An oil well optical fiber multi-parameter testing apparatus, comprising:
a data collection unit configured to collect monitoring data at a preset position, wherein the monitoring data at least includes temperature data, pressure data and vibration data;
a temperature analysis unit configured to perform temperature analysis on a hydrocarbon reservoir according to the temperature data;
a vibration analysis unit configured to perform vibration analysis on the hydrocarbon reservoir according to the vibration data;
a conjoint analysis unit configured to perform conjoint analysis on the hydrocarbon reservoir according to the temperature data, the pressure data and the vibration data;
a data obtaining unit configured to obtain production parameters of hydrocarbon reservoirs in different formations according to the conjoint analysis; and
a conclusion obtaining unit configured to obtain flow conclusions of the hydrocarbon reservoirs according to the production parameters of the hydrocarbon reservoirs.

10. The oil well optical fiber multi-parameter testing apparatus according to claim 9, wherein the data collection unit comprises a monitoring optical cable, the monitoring optical cable is provided therein with a plurality of optical fibers, each of which comprises one temperature measuring optical fiber, one vibration measuring optical fiber, and a plurality of pressure measuring optical fibers, and the number of the pressure measuring optical fibers is determined according to the number of pressure measuring points in the preset position, so that each of the pressure measuring optical fibers is provided at a corresponding pressure measuring point.

11. The oil well optical fiber multi-parameter testing apparatus according to claim 10, wherein the pressure measuring optical fiber is provided with a plurality of optical fiber pressure sensors, and the optical fiber pressure sensors are arranged in layers at corresponding formation depths.

12. The oil well optical fiber multi-parameter testing apparatus according to claim 11, wherein the monitoring optical cable is bound to a pipe string and placed into a well together therewith, and the pipe string is provided with pressure gauge carriers at positions where the optical fiber pressure sensors are located.

13. The oil well optical fiber multi-parameter testing apparatus according to claim 10, wherein the monitoring optical cable is protruded out of a through hole at a wellhead and connected to a test demodulation device on an FPSO hull, and the wellhead is sealed.

* * * * *